(12) United States Patent
Fan et al.

(10) Patent No.: US 12,328,752 B2
(45) Date of Patent: Jun. 10, 2025

(54) METHOD AND NETWORK DEVICE FOR LINK ADAPTATION

(71) Applicant: Telefonaktiebolaget LM Ericsson (publ), Stockholm (SE)

(72) Inventors: Rui Fan, Beijing (CN); Huaisong Zhu, Beijing (CN); Chi Chuen Yuen, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 680 days.

(21) Appl. No.: 17/609,584

(22) PCT Filed: May 10, 2019

(86) PCT No.: PCT/CN2019/086419
§ 371 (c)(1),
(2) Date: Nov. 8, 2021

(87) PCT Pub. No.: WO2020/227854
PCT Pub. Date: Nov. 19, 2020

(65) Prior Publication Data
US 2022/0191881 A1    Jun. 16, 2022

(51) Int. Cl.
*H04W 72/542* (2023.01)
*H04L 1/1607* (2023.01)

(52) U.S. Cl.
CPC ......... *H04W 72/542* (2023.01); *H04L 1/1607* (2013.01)

(58) Field of Classification Search
CPC .................................................. H04W 72/542
See application file for complete search history.

(56) References Cited

U.S. PATENT DOCUMENTS

| | | | |
|---|---|---|---|
| 7,809,336 B2 * | 10/2010 | Naguib | H04L 1/0003 375/267 |
| 9,225,412 B2 * | 12/2015 | Lee | H04L 1/00 |
| 9,941,959 B2 * | 4/2018 | Heath | H04L 43/045 |
| 2006/0002459 A1 * | 1/2006 | Kikuma | H04L 1/0007 375/259 |

(Continued)

FOREIGN PATENT DOCUMENTS

| CN | 1503469 A | 6/2004 |
|---|---|---|
| CN | 101686098 A | 3/2010 |

(Continued)

OTHER PUBLICATIONS

Communication with Supplementary European Search Report date Apr. 4, 2022 for Patent Application No. 19928398.7, consisting of 11—pages.

(Continued)

*Primary Examiner* — Guang W Li
(74) *Attorney, Agent, or Firm* — Weisberg I.P. Law, P.A.

(57) ABSTRACT

A method in a network device for link adaptation includes estimating a probability distribution of downlink Signal to Interference plus Noise Ratio, SINR, for a terminal device based at least on one or more Acknowledgement, ACK, or Negative Acknowledgement, NACK, messages from the terminal device. A Modulation and Coding Scheme, MCS, for downlink transmission to the terminal device is determined based on the estimated probability distribution of downlink SINR.

13 Claims, 6 Drawing Sheets

(56) References Cited

U.S. PATENT DOCUMENTS

| | | | | |
|---|---|---|---|---|
| 2009/0323792 A1* | 12/2009 | Zhou | ............ | H04L 1/0009 |
| | | | | 375/224 |
| 2010/0135320 A1* | 6/2010 | Tu | ............ | H04W 28/22 |
| | | | | 370/468 |
| 2010/0190457 A1* | 7/2010 | Tu | ............ | H04B 17/336 |
| | | | | 455/115.4 |
| 2015/0049629 A1* | 2/2015 | Alm | ............ | H04W 72/542 |
| | | | | 370/252 |
| 2021/0036804 A1* | 2/2021 | Zhu | ............ | H04L 1/0035 |

FOREIGN PATENT DOCUMENTS

| | | |
|---|---|---|
| EP | 2139141 A2 | 12/2009 |
| WO | 2010083661 A1 | 7/2010 |

OTHER PUBLICATIONS

M. A. Haleem et al.; Adaptive Stochastic Iterative Rate Selection for Wireless Channels; IEEE Communications Letters vol. 8, No. 5; May 2004, consisting of 3—pages.

Author Unknown, "Bandit Problems", Reinforcement Learning, Bandit Problems, Ray, https://oneraynyday github.o/ml/2018/05/03/Reinforcement-Learning-Bandit, accessed on Jan. 25, 2019, 2018, 1-8.

Enzenberger, Markus, "The UCB Algorithm", Paper Finite-time Analysis of the Multiarmed Bandit Problem, by Auer, Cesa-Bianchi, Fischer, Machine Learning 27, 2002, Mar. 14, 2007, 1-23.

* cited by examiner

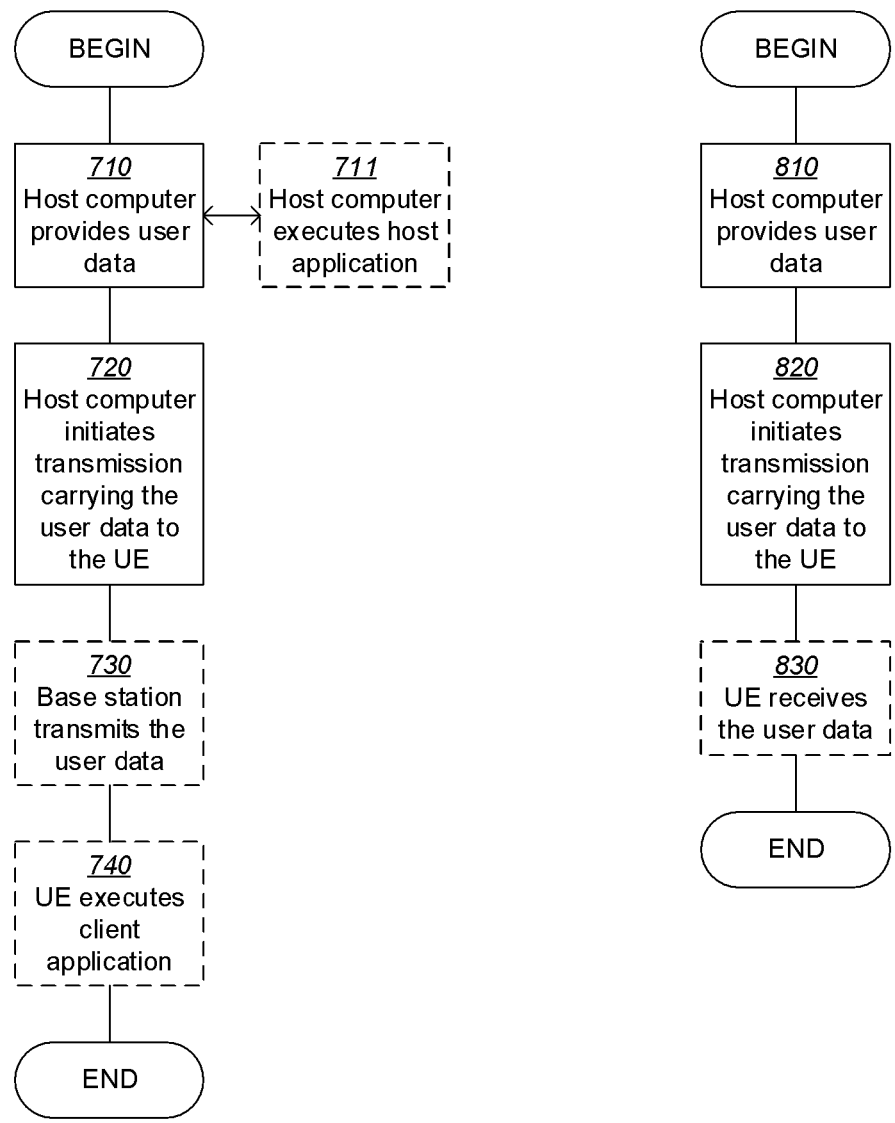

METHOD AND NETWORK DEVICE FOR LINK ADAPTATION

TECHNICAL FIELD

The present disclosure relates to wireless communication, and more particularly, to a method and a network device for link adaptation.

BACKGROUND

Link adaptation is a key technique in wireless networks. For link adaptation in downlink, a network device, e.g., evolved Node B (eNB) or gNB, selects an appropriate Modulation and Coding Scheme (MCS) for a downlink transmission towards a terminal device, e.g., User Equipment (UE), based on a Signal to Interference plus Noise Ratio (SINR) that is indicated in Channel State Information (CSI), or particularly Channel Quality Indicator (CQI), reported from the terminal device (the SINR may also be subjected to an outer loop adjustment according to a target Block Error Rate (BLER)). For example, a higher MCS (i.e., a higher modulation order and/or a higher coding rate) can be selected for a higher estimated SINR, and a lower MCS (i.e., a lower modulation order and/or a lower coding rate) can be selected for a lower estimated SINR. In this way, a high throughput and a low BLER can be achieved.

However, the SINR used for link adaptation may not be accurate in some cases, e.g., in a burst traffic or when an Active Antenna System (AAS) is deployed. In these cases, the CQI reported by the terminal device may not reflect the SINR experienced by the terminal device accurately.

For example, a terminal device may be equipped with more receiving antennas and thus have higher spatial processing capabilities for downlink transmissions. Such spatial processing capabilities, such as Interference Cancellation (IC) or noise and inter-cell interference suppression, are closely related to spatial characteristics of signals. According to relevant specifications of the $3^{rd}$ Generation Partnership Project (3GPP) for the $4^{th}$ Generation (4G) or the $5^{th}$ Generation (5G) communication protocols, the CSI is obtained based on a Cell Reference Signal (CRS) or a CSI Reference Signal (CSI-RS) over Physical Downlink Control Channel (PDCCH). Typically, the CRS or CSI-RS will not have any spatial processing gain as no IC or noise and inter-cell interference suppression is applied to PDCCH. However, with IC or noise and inter-cell interference suppression, traffic data over Physical Downlink Shared Channel (PDSCH) may have a higher SINR than the SINR measured on the CRS or CSI-RS. Furthermore, the beam used for the CRS or CSI-RS may be significantly different from the beam used for the traffic data, especially in the case of reciprocity based beamforming. Therefore, the SINR of the CRS or CSI-RS, which is indicated in the CSI or CQI, may be quite different from the SINR of the traffic data.

On the other hand, the terminal device may perform time domain filtering when calculating the CQI. In addition, due to signaling overhead (e.g., with a report periodicity of 20 ms), the CQI may not be updated timely to catch up with changes in interference.

As a result, the MCS selected based on the CSI or CQI may be too low, which is inefficient in terms of data throughput, or too high, which could lead to a high BLER and in turn a low data throughput as well.

SUMMARY

It is an object of the present disclosure to provide a method and a network device for link adaptation, capable of improving MCS selection for downlink transmission.

In a first aspect of the present disclosure, a method in a network device for link adaptation is provided. The method includes: estimating a probability distribution of downlink SINR for a terminal device based at least on one or more Acknowledgement (ACK) or Negative Acknowledgement (NACK) messages from the terminal device; and determining an MCS for downlink transmission to the terminal device based on the estimated probability distribution of downlink SINR.

In an embodiment, the operation of estimating may include: updating a probability value for each of a plurality of SINR candidates iteratively based on the one or more ACK or NACK messages.

In an embodiment, the plurality of SINR candidates may be set based on MCSs supported by the terminal device.

In an embodiment, the probability values for respective ones of the plurality of SINR candidates may initially be set to be equal.

In an embodiment, the probability value for each of the plurality of SINR candidates may initially be set based on an SINR associated with a downlink message for which an ACK message is received from the terminal device during a random access procedure, such that among the plurality of SINR candidates, those SINR candidates higher than or equal to the SINR have equal probability values and each SINR candidate lower than the SINR has a probability value of zero.

In an embodiment, the operation of updating may include: adjusting, in response to an ACK message from the terminal device that is associated with downlink data transmitted with a first MCS corresponding to a first SINR, the probability value for each of the plurality of SINR candidates, such that a sum of the respective probability values for those SINR candidates higher than or equal to the first SINR increases; or adjusting, in response to a NACK message from the terminal device that is associated with downlink data transmitted with a second MCS corresponding to a second SINR, the probability value for each of the plurality of SINR candidates, such that a sum of the respective probability values for those SINR candidates lower than the second SINR increases.

In an embodiment, the operation of estimating may further include: updating the probability value for each of the plurality of SINR candidates based on a forgetting factor when the terminal device has not been scheduled for downlink transmission for a predetermined time period.

In an embodiment, the operation of estimating may further include: updating the probability value for each of the plurality of SINR candidates based on a CQI from the terminal device.

In an embodiment, the operation of updating the probability value for each of the plurality of SINR candidates based on the CQI may include: updating the probability value for each of the plurality of SINR candidates based on a difference between an SINR reported in the CQI and an SINR reported in a previous CQI from the terminal device.

In an embodiment, the operation of determining may include: determining as the MCS an MCS corresponding to one of the plurality of SINR candidates that has the highest probability value.

In an embodiment, the operation of determining may include, when more than one of the plurality of SINR candidates has the highest probability value: determining as the MCS an MCS corresponding to the lowest one of the more than one SINR candidate.

In an embodiment, the operation of determining may include: calculating a target BLER for the downlink transmission; selecting one of the plurality of SINR candidates that is the highest SINR candidate to allow a sum of the probability values for all SINR candidates lower than or equal to the one SINR candidate to be smaller than the target BLER; and determining as the MCS an MCS corresponding to the one SINR candidate.

In an embodiment, the method may further include: selecting, after having determined one MCS as the MCS for downlink transmission to the terminal device for a predetermined number of consecutive times or after having received from the terminal device a predetermined number of consecutive ACK messages associated with downlink data transmitted with one MCS, an MCS higher than the one MCS for downlink transmission to the terminal device.

In a second aspect of the present disclosure, a network device is provided. The network device includes a transceiver, a processor and a memory. The memory contains instructions executable by the processor whereby the network device is operative to perform the method according to the above first aspect.

In a third aspect of the present disclosure, a computer readable storage medium is provided. The computer readable storage medium has computer program instructions stored thereon. The computer program instructions, when executed by a processor in a network device, cause the network device to perform the method according to the above first aspect.

With the embodiments of the present disclosure, a probability distribution of downlink SINR for a terminal device is estimated based at least on one or more ACK or NACK messages from the terminal device, and an MCS for downlink transmission to the terminal device can be determined based on the estimated probability distribution of downlink SINR. In this way, a proper MCS can be selected for downlink transmission in a more efficient manner.

BRIEF DESCRIPTION OF THE DRAWINGS

The above and other objects, features and advantages will be more apparent from the following description of embodiments with reference to the figures, in which:

FIGS. 7 to 8 are flowcharts illustrating methods implemented in a communication system including a host computer, a base station and a user equipment.

DETAILED DESCRIPTION

Figure 1:
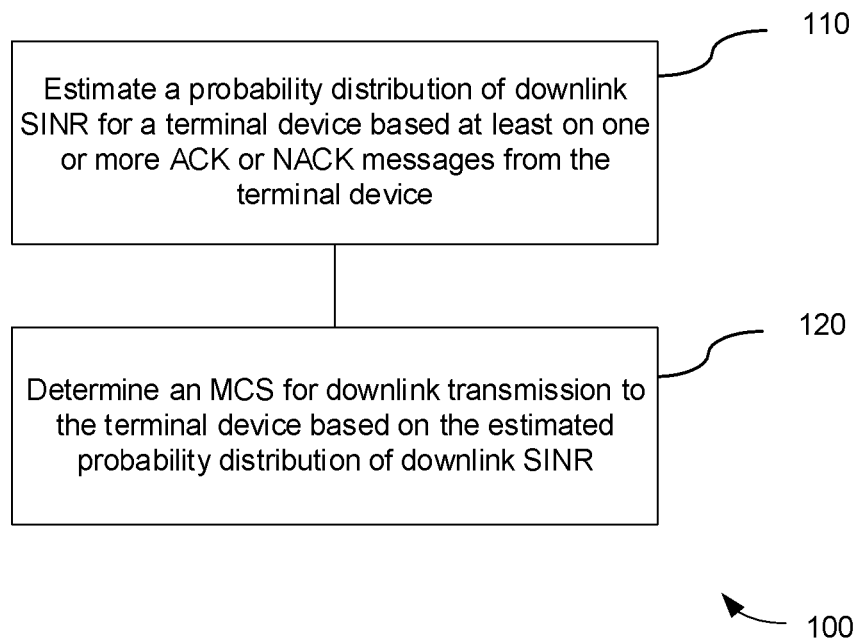
FIG. 1 is a flowchart illustrating a method for link adaptation according to an embodiment of the present disclosure.

As used herein, the term "wireless communication network" refers to a network following any suitable communication standards, such as NR, LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network node" or "network device" refers to a device in a wireless communication network via which a terminal device accesses the network and receives services therefrom. The network node or network device refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, a mobile phone, a cellular phone, a smart phone, voice over IP (VoIP) phones, wireless local loop phones, tablets, personal digital assistants (PDAs), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink transmission refers to a transmission from a network device to a terminal device, and an uplink transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

FIG. 1 is a flowchart illustrating a method 100 for link adaptation according to an embodiment of the present disclosure. The method 100 can be performed at a network device, e.g., an eNB or gNB.

At block 110, a probability distribution of downlink SINR for a terminal device is estimated based at least on one or more ACK or NACK messages from the terminal device.

In an example, in the block 110, a probability value for each of a plurality of SINR candidates can be updated iteratively based on the one or more ACK or NACK messages. Here, the plurality of SINR candidates can be set based on MCSs supported by the terminal device. For example, a terminal device may support up to 64 Quadrature Amplitude Modulation (QAM) and, according to relevant 3GPP specifications, for any SINR higher than or equal to 24 dB, 64 QAM may always be selected for the terminal device. In this case, the highest SINR candidate can be 24 dB. Similarly, the lowest SINR candidate may correspond to the lowest MCS supported by the terminal device.

Figure 2:
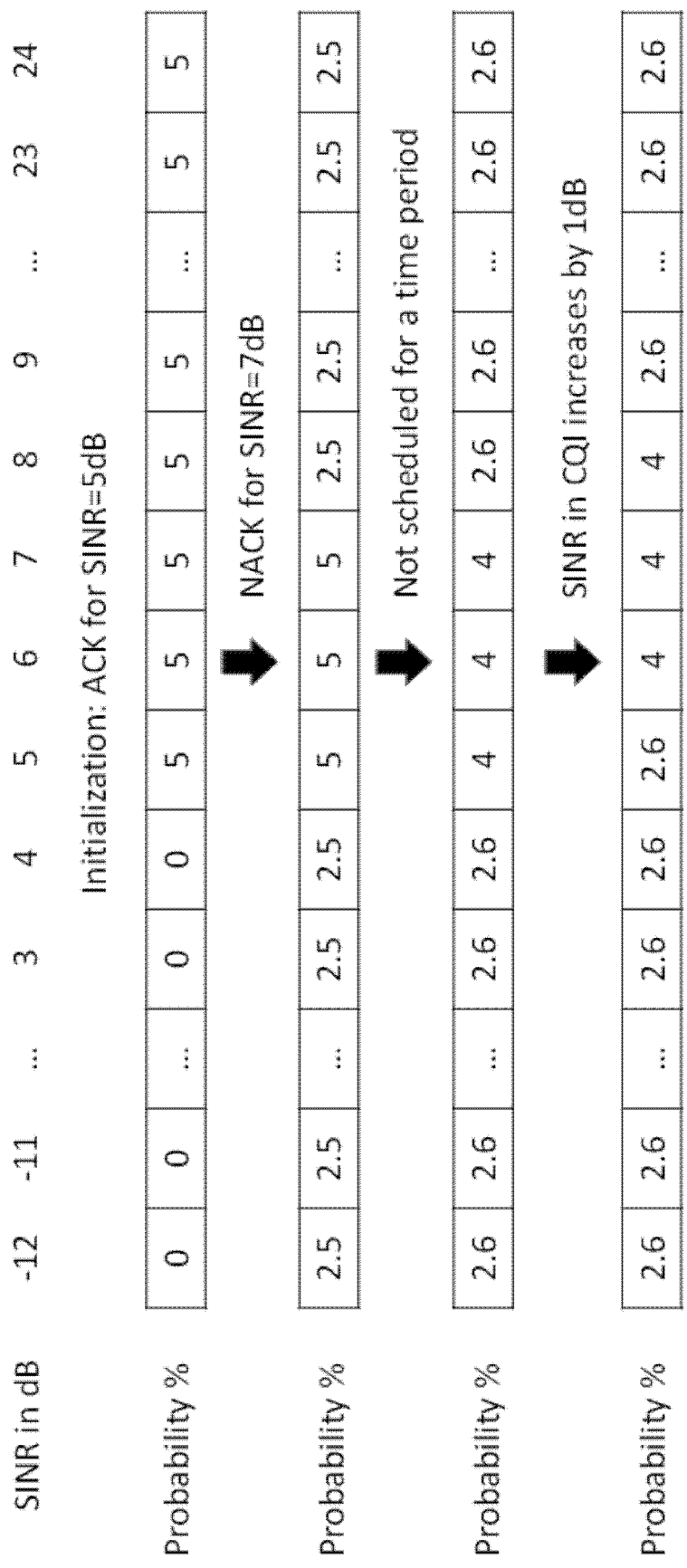
FIG. 2 is a schematic diagram showing how a probability distribution of downlink SINR can be updated according to an embodiment of the present disclosure.

FIG. 2 shows how a probability distribution of downlink SINR can be updated according to an embodiment of the present disclosure. The upmost row in FIG. 2 shows an example of SINR candidates, ranging from −12 dB to 24 dB, with a spacing of 1 dB between neighboring candidates. It can be appreciated that the range and spacing of the SINR candidates shown in FIG. 2 are illustrative only and other ranges and/or spacings can be used.

In an example, the probability value for each of the plurality of SINR candidates can be initially set based on an SINR associated with a downlink message for which an ACK message is received from the terminal device during a random access procedure, such that among the plurality of SINR candidates, those SINR candidates higher than or equal to the SINR have equal probability values and each SINR candidate lower than the SINR has a probability value of zero.

For example, referring to FIG. 2, during a random access procedure, a downlink message may be transmitted at an SINR of 5 dB and an ACK message for the downlink message is then received from the terminal device. In this case, the probability values for the SINR candidates can be initialized such that the SINR candidates higher than or equal to 5 dB may have equal probability values, i.e., 5% (note that the sum of the probability values for all the SINR candidates is inherently 1), and each SINR candidate lower than 5 dB has a probability value of zero.

Alternatively, the probability values for respective ones of the plurality of SINR candidates can be initially set to be equal. In this case, each of the SINR candidates in FIG. 2 may have a probability value of 1/37.

In an example, in response to an ACK message from the terminal device that is associated with downlink data transmitted with a first MCS corresponding to a first SINR, the probability value for each of the plurality of SINR candidates can be adjusted, such that a sum of the respective probability values for those SINR candidates higher than or equal to the first SINR increases, or that those SINR candidates lower than the first SINR have their probability values decreased. Alternatively, in response to a NACK message from the terminal device that is associated with downlink data transmitted with a second MCS corresponding to a second SINR, the probability value for each of the plurality of SINR candidates can be adjusted, such that a sum of the respective probability values for those SINR candidates lower than the second SINR increases, or that those SINR candidates higher than or equal to the second SINR have their probability values decreased.

Referring to FIG. 2, when a NACK message associated with downlink data transmitted with an MCS corresponding to an SINR of 7 dB is received from the terminal device, the probability value for each of the plurality of SINR candidates can be adjusted as shown in FIG. 2, i.e., the probability value for each SINR from −12 dB to 4 dB increases from 0 to 2.5%, the probability value for each SINR from 5 dB to 7 dB remains at 5%, and the probability value for each SINR from 8 dB to 24 dB decreases from 5% to 2.5%, subject to the constraint that the sum of the probability values for all the SINR candidates shall be 1. Alternatively, when an ACK message associated with downlink data transmitted with an MCS corresponding to an SINR of 7 dB is received from the terminal device, the probability value for each of the plurality of SINR candidates can be adjusted as follows: the probability value for each SINR from −12 dB to 4 dB remains at 0, the probability value for each SINR from 5 dB to 6 dB decreases from 5% to 2%, and the probability value for each SINR from 7 dB to 24 dB increases from 5% to 5.33%, subject to the constraint that the sum of the probability values for all the SINR candidates shall be 1.

In an example, when the terminal device has not been scheduled for downlink transmission for a predetermined time period, the probability value for each of the plurality of SINR candidates can be updated based on a forgetting factor, as confidences of the previously estimated probability values may decrease over time. For example, the forgetting factor can be applied as follows:

$$P'_i = (1-\alpha)*P_i + \alpha/N \quad (1)$$

where $\alpha$ denotes the forgetting factor, which can be e.g., 0.1, $P_i$ denotes the previous estimated probability value for the i-th SINR candidate, for i=1, 2, . . . , N and N is the total number of SINR candidates, and $P'_i$ denotes the updated probability value for the i-th SINR candidate. Referring to FIG. 2, with the adjustment based on the forgetting factor, the probability value for each SINR from −12 dB to 4 dB increases from 2.5 to 2.6%, the probability value for each SINR from 5 dB to 7 dB decreases from 5% to 4%, and the probability value for each SINR from 8 dB to 24 dB increases from 2.5 to 2.6%, subject to the constraint that the sum of the probability values for all the SINR candidates shall be 1.

In addition, the probability value for each of the plurality of SINR candidates can be updated based on a CQI from the terminal device. While as discussed above the CQI may not reflect the absolute SINR experienced by the terminal device accurately. However, a change in SINRs reported in consecutive CQIs may be reflect a change in SINRs experienced by the terminal device. Accordingly, the probability value for each of the plurality of SINR candidates can be updated based on a difference between an SINR reported in the CQI and an SINR reported in a previous CQI from the terminal device. Referring to FIG. 2, when the SINR reported in the CQI increases by 1 dB when compared with the SINR reported in the previous CQI, the probability values can be shifted to the right by 1 dB, i.e., the probability value for each SINR from −12 dB to 5 dB is now 2.6%, the probability value for each SINR from 6 dB to 8 dB is now 4%, and the probability value for each SINR from 9 dB to 24 dB is now 2.6%.

At block 120, an MCS for downlink transmission to the terminal device is determined based on the estimated probability distribution of downlink SINR.

In an example, in the block 120, an MCS corresponding to one of the plurality of SINR candidates that has the highest probability value can be determined as the MCS for downlink transmission to the terminal device. When more than one of the plurality of SINR candidates has the highest probability value, an MCS corresponding to the lowest one of the more than one SINR candidate can be preferably determined as the MCS for downlink transmission to the terminal device. Referring to FIG. 2, when the SINR candidates 5 dB, 6 dB and 7 dB all have the highest probability of 5%, the MCS corresponding to 5 dB can be determined as the MCS for downlink transmission to the terminal device.

Alternatively, in the block 120, a target BLER can be first calculated for the downlink transmission. For example, the target BLER may be dependent on a Quality of Service (QoS) required for the downlink transmission, e.g., the target BLER can be 10% for Voice over Internet Protocol (VoIP) transmission or 20% for File Transfer Protocol (FTP) transmission. Next, one of the plurality of SINR candidates can be selected, which is the highest SINR candidate to allow a sum of the probability values for all SINR candidates lower than or equal to the one SINR candidate to be smaller than the target BLER. Then, an MCS corresponding to the one SINR candidate can be determined as the MCS for downlink transmission to the terminal device.

In an example, in order to improve data throughput, it would be desirable in some circumstances to attempt to select an MCS even higher than the MCS corresponding to the SINR candidate having the highest probability value. For example, referring to FIG. 2, when the MCS corresponding to 5 dB has been determined as the MCS for downlink transmission to the terminal device and the downlink SINR is actually 15 dB now, downlink transmissions using the MCS corresponding to the SINR of 5 dB may always be acknowledged (i.e., with ACK messages) and the probability value for the SINR candidate of 5 dB may keep increasing but always be the highest. As a result, the MCS corresponding to the SINR of 5 dB will always be selected and there would be no opportunity to select a higher MCS, despite the much higher actual downlink SINR. In view of this, after having determined one MCS as the MCS for downlink transmission to the terminal device for a predetermined number of consecutive times or after having received from the terminal device a predetermined number of consecutive ACK messages associated with downlink data transmitted with one MCS, an MCS higher than the one MCS for downlink transmission to the terminal device can be selected, in attempt to increase data throughput.

Figure 3:
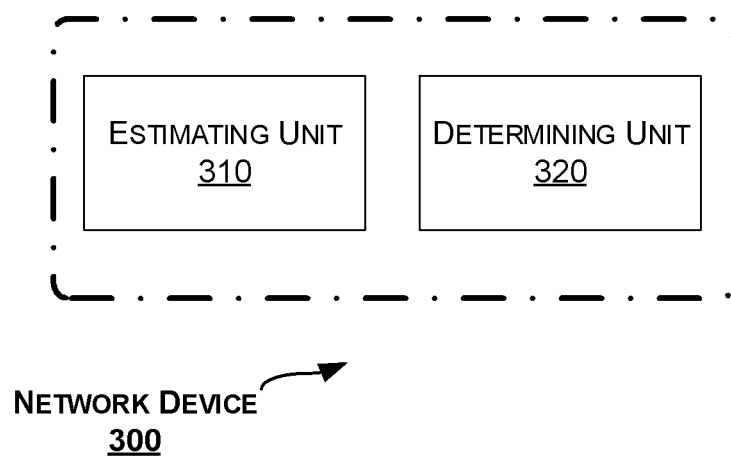
FIG. 3 is a block diagram of a network device according to an embodiment of the present disclosure.

Correspondingly to the method 100 as described above, a network device is provided. FIG. 3 is a block diagram of a network device 300 according to an embodiment of the present disclosure. The network device 300 can be e.g., an eNB or gNB.

As shown in FIG. 3, the network device 300 includes an estimating unit 310 configured to estimate a probability distribution of downlink SINR for a terminal device based at least on one or more ACK or NACK messages from the terminal device. The network device 300 further includes a determining unit 320 configured to determine an MCS for downlink transmission to the terminal device based on the estimated probability distribution of downlink SINR.

In an embodiment, the estimating unit 310 can be configured to: update a probability value for each of a plurality of SINR candidates iteratively based on the one or more ACK or NACK messages.

In an embodiment, the plurality of SINR candidates may be set based on MCSs supported by the terminal device.

In an embodiment, the probability values for respective ones of the plurality of SINR candidates may initially be set to be equal.

In an embodiment, the probability value for each of the plurality of SINR candidates may initially be set based on an SINR associated with a downlink message for which an ACK message is received from the terminal device during a random access procedure, such that among the plurality of SINR candidates, those SINR candidates higher than or equal to the SINR have equal probability values and each SINR candidate lower than the SINR has a probability value of zero.

In an embodiment, the estimating unit 310 being configured to update the probability value for each of the plurality of SINR candidates iteratively based on the one or more ACK or NACK messages may include the estimating unit 310 being configured to: adjust, in response to an ACK message from the terminal device that is associated with downlink data transmitted with a first MCS corresponding to a first SINR, the probability value for each of the plurality of SINR candidates, such that a sum of the respective probability values for those SINR candidates higher than or equal to the first SINR increases; or adjust, in response to a NACK message from the terminal device that is associated with downlink data transmitted with a second MCS corresponding to a second SINR, the probability value for each of the plurality of SINR candidates, such that a sum of the respective probability values for those SINR candidates lower than the second SINR increases.

In an embodiment, the estimating unit 310 can further be configured to: update the probability value for each of the plurality of SINR candidates based on a forgetting factor when the terminal device has not been scheduled for downlink transmission for a predetermined time period.

In an embodiment, the estimating unit 310 can further be configured to: update the probability value for each of the plurality of SINR candidates based on a CQI from the terminal device.

In an embodiment, the estimating unit 310 being configured to update the probability value for each of the plurality of SINR candidates based on the CQI may include the estimating unit 310 being configured to: update the probability value for each of the plurality of SINR candidates based on a difference between an SINR reported in the CQI and an SINR reported in a previous CQI from the terminal device.

In an embodiment, the determining unit 320 can be configured to: determine as the MCS an MCS corresponding to one of the plurality of SINR candidates that has the highest probability value.

In an embodiment, the determining unit 320 can be configured to, when more than one of the plurality of SINR candidates has the highest probability value: determine as the MCS an MCS corresponding to the lowest one of the more than one SINR candidate.

In an embodiment, the determining unit 320 can be configured to: calculate a target BLER for the downlink transmission; select one of the plurality of SINR candidates that is the highest SINR candidate to allow a sum of the probability values for all SINR candidates lower than or equal to the one SINR candidate to be smaller than the target BLER; and determine as the MCS an MCS corresponding to the one SINR candidate.

In an embodiment, the network device 300 may further include a selecting unit configured to select, after having determined one MCS as the MCS for downlink transmission to the terminal device for a predetermined number of consecutive times or after having received from the terminal device a predetermined number of consecutive ACK messages associated with downlink data transmitted with one MCS, an MCS higher than the one MCS for downlink transmission to the terminal device.

The estimating unit 310 and the determining unit 320 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 1.

Figure 4:
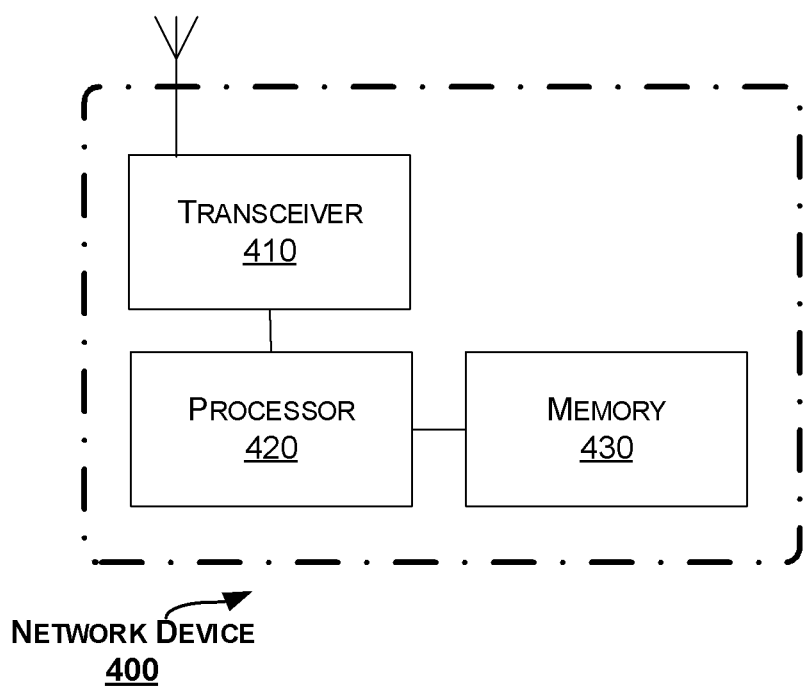
FIG. 4 is a block diagram of a network device according to another embodiment of the present disclosure.

FIG. 4 is a block diagram of a network device 400 according to another embodiment of the present disclosure.

The network device 400 includes a transceiver 410, a processor 420 and a memory 430. The memory 430 contains instructions executable by the processor 420 whereby the network device 400 is operative to perform the actions, e.g., of the procedure described earlier in conjunction with FIG. 1. Particularly, the memory 430 contains instructions executable by the processor 420 whereby the network device 400 is operative to: estimate a probability distribution of downlink SINR for a terminal device based at least on one or more ACK or NACK messages from the terminal device; and determine an MCS for downlink transmission to the terminal device based on the estimated probability distribution of downlink SINR.

In an embodiment, the operation of estimating may include: updating a probability value for each of a plurality of SINR candidates iteratively based on the one or more ACK or NACK messages.

In an embodiment, the plurality of SINR candidates may be set based on MCSs supported by the terminal device.

In an embodiment, the probability values for respective ones of the plurality of SINR candidates may initially be set to be equal.

In an embodiment, the probability value for each of the plurality of SINR candidates may initially be set based on an SINR associated with a downlink message for which an ACK message is received from the terminal device during a random access procedure, such that among the plurality of SINR candidates, those SINR candidates higher than or equal to the SINR have equal probability values and each SINR candidate lower than the SINR has a probability value of zero.

In an embodiment, the operation of updating may include: adjusting, in response to an ACK message from the terminal device that is associated with downlink data transmitted with a first MCS corresponding to a first SINR, the probability value for each of the plurality of SINR candidates, such that a sum of the respective probability values for those SINR candidates higher than or equal to the first SINR increases; or adjusting, in response to a NACK message from the terminal device that is associated with downlink data transmitted with a second MCS corresponding to a second SINR, the probability value for each of the plurality of SINR candidates, such that a sum of the respective probability values for those SINR candidates lower than the second SINR increases.

In an embodiment, the operation of estimating may further include: updating the probability value for each of the plurality of SINR candidates based on a forgetting factor when the terminal device has not been scheduled for downlink transmission for a predetermined time period.

In an embodiment, the operation of estimating may further include: updating the probability value for each of the plurality of SINR candidates based on a CQI from the terminal device.

In an embodiment, the operation of updating the probability value for each of the plurality of SINR candidates based on the CQI may include: updating the probability value for each of the plurality of SINR candidates based on a difference between an SINR reported in the CQI and an SINR reported in a previous CQI from the terminal device.

In an embodiment, the operation of determining may include: determining as the MCS an MCS corresponding to one of the plurality of SINR candidates that has the highest probability value.

In an embodiment, the operation of determining may include, when more than one of the plurality of SINR candidates has the highest probability value: determining as the MCS an MCS corresponding to the lowest one of the more than one SINR candidate.

In an embodiment, the operation of determining may include: calculating a target BLER for the downlink transmission; selecting one of the plurality of SINR candidates that is the highest SINR candidate to allow a sum of the probability values for all SINR candidates lower than or equal to the one SINR candidate to be smaller than the target BLER; and determining as the MCS an MCS corresponding to the one SINR candidate.

In an embodiment, the memory 430 may further contain instructions executable by the processor 420 whereby the network device 400 is operative to: select, after having determined one MCS as the MCS for downlink transmission to the terminal device for a predetermined number of consecutive times or after having received from the terminal device a predetermined number of consecutive ACK messages associated with downlink data transmitted with one MCS, an MCS higher than the one MCS for downlink transmission to the terminal device.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 420 causes the network device 400 to perform the actions, e.g., of the procedure described earlier in conjunction with FIG. 1.

The computer program product may be configured as a computer program code structured in computer program modules. The computer program modules could essentially perform the actions of the flow illustrated in FIG. 1.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 5:
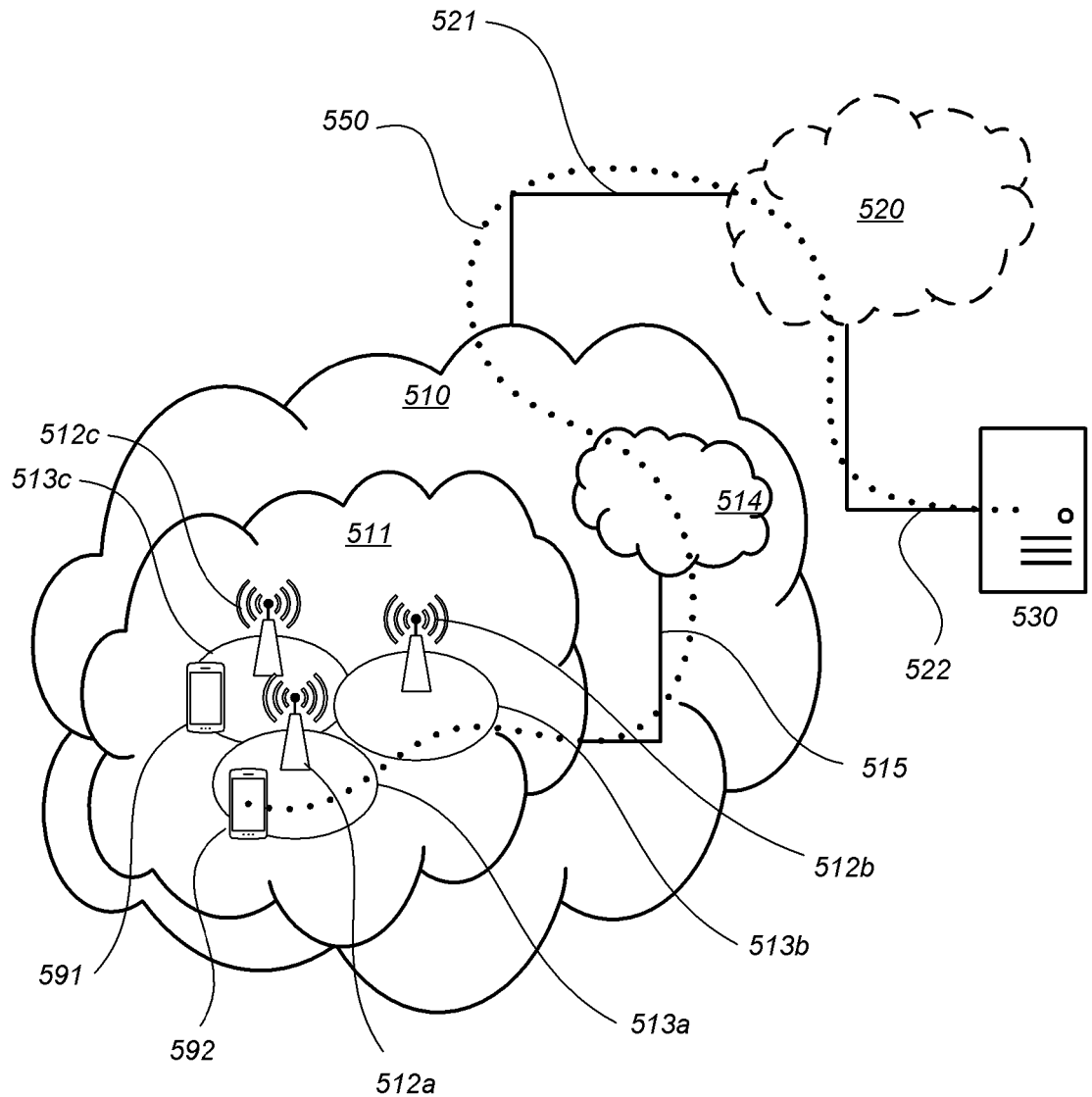
FIG. 5 schematically illustrates a telecommunication network connected via an intermediate network to a host computer.

With reference to FIG. 5, in accordance with an embodiment, a communication system includes a telecommunication network 510, such as a 3GPP-type cellular network, which comprises an access network 511, such as a radio access network, and a core network 514. The access network 511 comprises a plurality of base stations 512a, 512b, 512c, such as NBs, eNBs, gNBs or other types of wireless access points, each defining a corresponding coverage area 513a, 513b, 513c. Each base station 512a, 512b, 512c is connectable to the core network 514 over a wired or wireless connection 515. A first user equipment (UE) 591 located in coverage area 513c is configured to wirelessly connect to, or be paged by, the corresponding base station 512c. A second UE 592 in coverage area 513a is wirelessly connectable to the corresponding base station 512a. While a plurality of UEs 591, 592 are illustrated in this example, the disclosed embodiments are equally applicable to a situation where a sole UE is in the coverage area or where a sole UE is connecting to the corresponding base station 512.

The telecommunication network 510 is itself connected to a host computer 530, which may be embodied in the hardware and/or software of a standalone server, a cloud-implemented server, a distributed server or as processing resources in a server farm. The host computer 530 may be under the ownership or control of a service provider, or may be operated by the service provider or on behalf of the service provider. The connections 521, 522 between the telecommunication network 510 and the host computer 530 may extend directly from the core network 514 to the host computer 530 or may go via an optional intermediate network 520. The intermediate network 520 may be one of, or a combination of more than one of, a public, private or hosted network; the intermediate network 520, if any, may be a backbone network or the Internet; in particular, the intermediate network 520 may comprise two or more sub-networks (not shown).

The communication system of FIG. 5 as a whole enables connectivity between one of the connected UEs 591, 592 and the host computer 530. The connectivity may be described as an over-the-top (OTT) connection 550. The host computer 530 and the connected UEs 591, 592 are configured to communicate data and/or signaling via the OTT connection 550, using the access network 511, the core network 514, any intermediate network 520 and possible further infrastructure (not shown) as intermediaries. The OTT connection 550 may be transparent in the sense that the participating communication devices through which the OTT connection 550 passes are unaware of routing of uplink and downlink communications. For example, a base station 512 may not or need not be informed about the past routing of an incoming downlink communication with data originating from a host computer 530 to be forwarded (e.g., handed over) to a connected UE 591. Similarly, the base station 512 need not be aware of the future routing of an outgoing uplink communication originating from the UE 591 towards the host computer 530.

Example implementations, in accordance with an embodiment, of the UE, base station and host computer discussed in the preceding paragraphs will now be described with reference to FIG. 6. In a communication system 600, a host computer 610 comprises hardware 615 including a communication interface 616 configured to set up and maintain a wired or wireless connection with an interface of a different communication device of the communication system 600. The host computer 610 further comprises processing circuitry 618, which may have storage and/or processing capabilities. In particular, the processing circuitry 618 may comprise one or more programmable processors, application-specific integrated circuits, field programmable gate arrays or combinations of these (not shown) adapted to execute instructions. The host computer 610 further comprises software 611, which is stored in or accessible by the host computer 610 and executable by the processing circuitry 618. The software 611 includes a host application 612. The host application 612 may be operable to provide a service to a remote user, such as a UE 630 connecting via an OTT connection 650 terminating at the UE 630 and the host computer 610. In providing the service to the remote user, the host application 612 may provide user data which is transmitted using the OTT connection 650.

The communication system 600 further includes a base station 620 provided in a telecommunication system and comprising hardware 625 enabling it to communicate with the host computer 610 and with the UE 630. The hardware 625 may include a communication interface 626 for setting up and maintaining a wired or wireless connection with an interface of a different communication device of the communication system 600, as well as a radio interface 627 for setting up and maintaining at least a wireless connection 670 with a UE 630 located in a coverage area (not shown in FIG. 6) served by the base station 620. The communication interface 626 may be configured to facilitate a connection 650 to the host computer 610. The connection 650 may be direct or it may pass through a core network (not shown in FIG. 6) of the telecommunication system and/or through one or more intermediate networks outside the telecommunication system. In the embodiment shown, the hardware 625 of the base station 620 further includes processing circuitry 628, which may comprise one or more programmable processors, application-specific integrated circuits, field programmable gate arrays or combinations of these (not shown) adapted to execute instructions. The base station 620 further has software 621 stored internally or accessible via an external connection.

The communication system 600 further includes the UE 630 already referred to. Its hardware 635 may include a radio interface 637 configured to set up and maintain a wireless connection 670 with a base station serving a coverage area in which the UE 630 is currently located. The hardware 635 of the UE 630 further includes processing circuitry 638, which may comprise one or more programmable processors, application-specific integrated circuits, field programmable gate arrays or combinations of these (not shown) adapted to execute instructions. The UE 630 further comprises software 631, which is stored in or accessible by the UE 630 and executable by the processing circuitry 638. The software 631 includes a client application 632. The client application 632 may be operable to provide a service to a human or non-human user via the UE 630, with the support of the host computer 610. In the host computer 610, an executing host application 612 may communicate with the executing client application 632 via the OTT connection 650 terminating at the UE 630 and the host computer 610. In providing the service to the user, the client application 632 may receive request data from the host application 612 and provide user data in response to the request data. The OTT connection 650 may transfer both the request data and the user data. The client application 632 may interact with the user to generate the user data that it provides.

Figure 6:
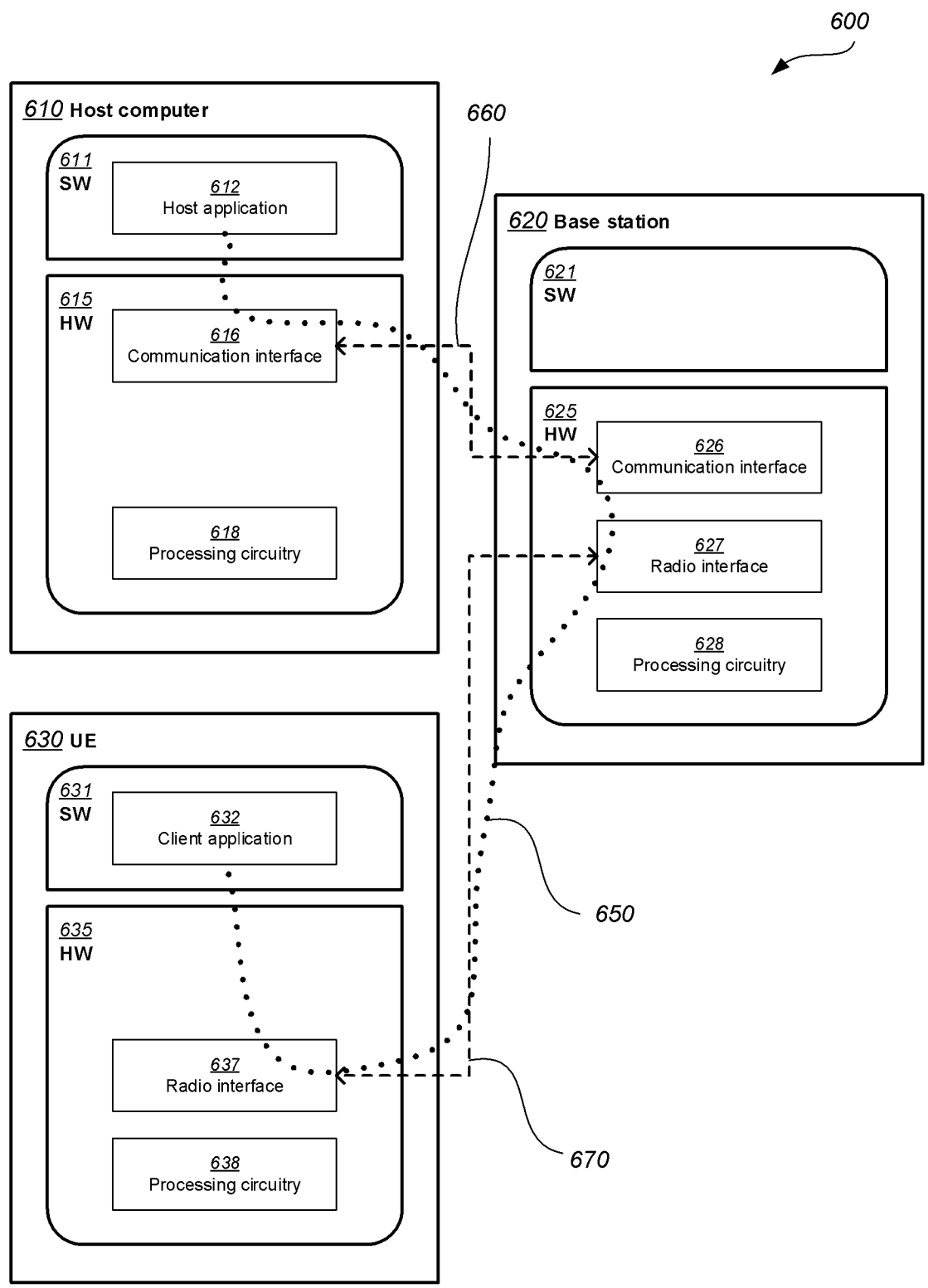
FIG. 6 is a generalized block diagram of a host computer communicating via a base station with a user equipment over a partially wireless connection.

It is noted that the host computer 610, base station 620 and UE 630 illustrated in FIG. 6 may be identical to the host computer 530, one of the base stations 512a, 512b, 512c and one of the UEs 591, 592 of FIG. 5, respectively. This is to say, the inner workings of these entities may be as shown in FIG. 6 and independently, the surrounding network topology may be that of FIG. 5.

In FIG. 6, the OTT connection 650 has been drawn abstractly to illustrate the communication between the host computer 610 and the use equipment 630 via the base station 620, without explicit reference to any intermediary devices and the precise routing of messages via these devices. Network infrastructure may determine the routing, which it may be configured to hide from the UE 630 or from the service provider operating the host computer 610, or both. While the OTT connection 650 is active, the network infrastructure may further take decisions by which it dynamically changes the routing (e.g., on the basis of load balancing consideration or reconfiguration of the network).

The wireless connection 670 between the UE 630 and the base station 620 is in accordance with the teachings of the embodiments described throughout this disclosure. One or more of the various embodiments improve the performance of OTT services provided to the UE 630 using the OTT connection 650, in which the wireless connection 670 forms the last segment. More precisely, the teachings of these embodiments may improve the data throughput and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 650 between the host computer 610 and UE 630, in response to variations in the measurement results. The measurement procedure and/or the network functionality for reconfiguring the OTT connection 650 may be implemented in the software 611 of the host computer 610 or in the software 631 of the UE 630, or both. In embodiments, sensors (not shown) may be deployed in or in association with communication devices through which the OTT connection 650 passes; the sensors may participate in the measurement procedure by supplying values of the monitored quantities exemplified above, or supplying values of other physical quantities from which software 611, 631 may compute or estimate the monitored quantities. The reconfiguring of the OTT connection 650 may include message format, retransmission settings, preferred routing etc.; the reconfiguring need not affect the base station 620, and it may be unknown or imperceptible to the base station 620. Such procedures and functionalities may be known and practiced in the art. In certain embodiments, measurements may involve proprietary UE signaling facilitating the host computer's 610 measurements of throughput, propagation times, latency and the like. The measurements may be implemented in that the software 611, 631 causes messages to be transmitted, in particular empty or 'dummy' messages, using the OTT connection 650 while it monitors propagation times, errors etc.

FIG. 7 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 7 will be included in this section. In a first step 710 of the method, the host computer provides user data. In an optional substep 711 of the first step 710, the host computer provides the user data by executing a host application. In a second step 720, the host computer initiates a transmission carrying the user data to the UE. In an optional third step 730, the base station transmits to the UE the user data which was carried in the transmission that the host computer initiated, in accordance with the teachings of the embodiments described throughout this disclosure. In an optional fourth step 740, the UE executes a client application associated with the host application executed by the host computer.

FIG. 8 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 8 will be included in this section. In a first step 810 of the method, the host computer provides user data. In an optional substep (not shown) the host computer provides the user data by executing a host application. In a second step 820, the host computer initiates a transmission carrying the user data to the UE. The transmission may pass via the base station, in accordance with the teachings of the embodiments described throughout this disclosure. In an optional third step 830, the UE receives the user data carried in the transmission.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a network device for link adaptation, comprising:
   estimating a probability distribution of downlink Signal to Interference plus Noise Ratio (SINR) for a terminal device based on one or more Negative Acknowledgement (NACK) messages from the terminal device, the estimating comprising:
      updating a probability value for each of a plurality of SINR candidates iteratively based on the one or more NACK messages; and
      updating the probability value for each of the plurality of SINR candidates based on a forgetting factor when the terminal device has not been scheduled for downlink transmission for a predetermined time period, the updating when the terminal device has not been scheduled for downlink transmission being based on $P'_i = (1-\alpha)*P_i + \alpha/N$, $\alpha$ denoting the forgetting factor, $P_i$ denoting a previous estimated probability value an i-th SINR candidate, N denoting a total number of the SINR candidates, and $P'_i$ denoting the updated probability value for the i-th SINR candidate, i and N being positive integers; and
   determining a Modulation and Coding Scheme (MCS) for downlink transmission to the terminal device based on the estimated probability distribution of downlink SINR.

2. The method of claim 1, wherein the plurality of SINR candidates are set based on MCSs supported by the terminal device.

3. The method of claim 1, wherein the probability values for respective ones of the plurality of SINR candidates are initially set to be equal.

4. The method of claim 1, wherein the probability value for each of the plurality of SINR candidates is initially set based on an SINR associated with a downlink message for which an ACK message is received from the terminal device during a random access procedure, such that among the plurality of SINR candidates, those SINR candidates higher than or equal to the SINR have equal probability values and each SINR candidate lower than the SINR has a probability value of zero.

5. The method of claim 1, wherein said updating comprises:
   adjusting, in response to an ACK message from the terminal device that is associated with downlink data transmitted with a first MCS corresponding to a first SINR, the probability value for each of the plurality of SINR candidates, such that a sum of the respective probability values for those SINR candidates higher than or equal to the first SINR increases; or
   adjusting, in response to a NACK message from the terminal device that is associated with downlink data transmitted with a second MCS corresponding to a second SINR, the probability value for each of the plurality of SINR candidates, such that a sum of the respective probability values for those SINR candidates lower than the second SINR increases.

6. The method of claim 1, wherein said estimating further comprises:
   updating the probability value for each of the plurality of SINR candidates based on a Channel Quality Indicator (CQI) from the terminal device.

7. The method of claim 6, wherein said updating the probability value for each of the plurality of SINR candidates based on the CQI comprises:
   updating the probability value for each of the plurality of SINR candidates based on a difference between an SINR reported in the CQI and an SINR reported in a previous CQI from the terminal device.

8. The method of claim 1, wherein said determining comprises:
   determining as the MCS an MCS corresponding to one of the plurality of SINR candidates that has the highest probability value.

9. The method of claim 8, wherein said determining comprises, when more than one of the plurality of SINR candidates has the highest probability value:
   determining as the MCS an MCS corresponding to the lowest one of the more than one SINR candidate.

10. The method of claim 1, wherein said determining comprises:
    calculating a target Block Error Rate (BLER) for the downlink transmission;
    selecting one of the plurality of SINR candidates that is the highest SINR candidate to allow a sum of the probability values for all SINR candidates lower than or equal to the one SINR candidate to be smaller than the target BLER; and
    determining as the MCS an MCS corresponding to the one SINR candidate.

11. The method of claim 1, further comprising:
    selecting, after having determined one MCS as the MCS for downlink transmission to the terminal device for a predetermined number of consecutive times or after having received from the terminal device a predetermined number of consecutive ACK messages associated with downlink data transmitted with one MCS, an MCS higher than the one MCS for downlink transmission to the terminal device.

12. A network device, comprising a transceiver, a processor and a memory, the memory comprising instructions executable by the processor whereby the network device is operative to:
  estimate a probability distribution of downlink Signal to Interference plus Noise Ratio (SINR) for a terminal device based on one or more Negative Acknowledgement (NACK) messages from the terminal device, the estimating comprising:
    updating a probability value for each of a plurality of SINR candidates iteratively based on the one or more NACK messages; and
    updating the probability value for each of the plurality of SINR candidates based on a forgetting factor when the terminal device has not been scheduled for downlink transmission for a predetermined time period, the updating when the terminal device has not been scheduled for downlink transmission being based on $P'_i=(1-\alpha)*P_i+\alpha/N$, $\alpha$ denoting the forgetting factor, $P_i$ denoting a previous estimated probability value an i-th SINR candidate, N denoting a total number of the SINR candidates, and $P'_i$ denoting the updated probability value for the i-th SINR candidate, i and N being positive integers; and
  determine a Modulation and Coding Scheme (MCS) for downlink transmission to the terminal device based on the estimated probability distribution of downlink SINR.

13. A non-transitory, computer readable storage medium having computer program instructions stored thereon, the computer program instructions being configured to, when executed by a processor in a network device, cause the network device to:
  estimate a probability distribution of downlink Signal to Interference plus Noise Ratio (SINR) for a terminal device based on one or more Negative Acknowledgement (NACK) messages from the terminal device, the estimating comprising:
    updating a probability value for each of a plurality of SINR candidates iteratively based on the one or more NACK messages; and
    updating the probability value for each of the plurality of SINR candidates based on a forgetting factor when the terminal device has not been scheduled for downlink transmission for a predetermined time period, the updating when the terminal device has not been scheduled for downlink transmission being based on $P'_i=(1-\alpha)*P_i+\alpha/N$, $\alpha$ denoting the forgetting factor, $P_i$ denoting a previous estimated probability value an i-th SINR candidate, N denoting a total number of the SINR candidates, and $P'_i$ denoting the updated probability value for the i-th SINR candidate, i and N being positive integers; and
  determine a Modulation and Coding Scheme (MCS) for downlink transmission to the terminal device based on the estimated probability distribution of downlink SINR.

\* \* \* \* \*